United States Patent
Wang et al.

(10) Patent No.: US 9,614,754 B2
(45) Date of Patent: Apr. 4, 2017

(54) METHOD, DEVICE, AND SYSTEM FOR PACKET ROUTING IN A NETWORK

(71) Applicant: HUAWEI TECHNOLOGIES CO., LTD., Shenzhen, Guangdong (CN)

(72) Inventors: Bibo Wang, Shenzhen (CN); Junqiang Zhou, Xi'an (CN); Xitong Zhang, Xi'an (CN); Fujun Chen, Xi'an (CN); Tianyi Wu, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/173,730

(22) Filed: Jun. 6, 2016

(65) Prior Publication Data
US 2016/0285748 A1    Sep. 29, 2016

Related U.S. Application Data

(63) Continuation of application No. PCT/CN2013/088710, filed on Dec. 6, 2013.

(51) Int. Cl.
*H04L 12/28*    (2006.01)
*H04L 12/721*    (2013.01)
(Continued)

(52) U.S. Cl.
CPC .............. *H04L 45/26* (2013.01); *H04L 45/02* (2013.01); *H04L 45/66* (2013.01); *H04L 45/74* (2013.01);
(Continued)

(58) Field of Classification Search
CPC ....... H04L 61/103; H04L 45/74; H04L 49/70; H04L 41/0803; H04L 45/586;
(Continued)

(56) References Cited

U.S. PATENT DOCUMENTS

| | | |
|---|---|---|
| 2004/0255166 A1 | 12/2004 | Shimizu |
| 2010/0257263 A1* | 10/2010 | Casado ................... H04L 49/00 709/223 |

(Continued)

FOREIGN PATENT DOCUMENTS

| | | |
|---|---|---|
| CN | 1540944 A | 10/2004 |
| CN | 1612562 A | 5/2005 |

(Continued)

OTHER PUBLICATIONS

Koerener Marc et al:"Optimizing openflow load-balancing with L2 direct server return", 2013 fourth international conference on the network of the future (nof), IEEE, Oct. 23, 2013, XP032558790. total 6 pages.

*Primary Examiner* — Michael J Moore, Jr.
(74) *Attorney, Agent, or Firm* — Huawei Technologies Co., Ltd

(57) ABSTRACT

A method for distributed routing of a packet in a network is provided. The network includes a controller, a first server, a second server, and a first switch. The method includes: obtaining identifiers of the two servers in the network and network connection information; determining whether the two servers are in two different subnets of the network and whether the two different subnets are configured on a same router according to the identifiers of the two servers and the network connection information of the two servers; when it is determined that that the two servers are in two different subnets of the network and the two different subnets are configured on a same router, instructing the first switch to modify a packet header of a packet sent by the first server to the second server and forward the modified packet to the second server.

15 Claims, 11 Drawing Sheets

---

301 — A controller obtains identifiers of two servers and network topology information, where the network topology information includes network connection information of the two servers 302 — When the controller determines, by using the identifiers of the two servers and according to the network connection information of the two servers, that the two servers are in different subnets and that the two servers are under a same router, the controller creates a first distributed routing rule, and sends the first distributed routing rule to a first switch directly connected to a first server, where the first distributed routing rule is used to instruct the first switch to modify a packet header for a packet sent by the first server to a second server, and to forward the modified packet

(51) Int. Cl.
*H04L 12/751* (2013.01)
*H04L 12/741* (2013.01)
*H04L 29/12* (2006.01)
*H04L 12/715* (2013.01)
*H04L 12/717* (2013.01)

(52) U.S. Cl.
CPC .......... *H04L 61/6022* (2013.01); *H04L 45/04* (2013.01); *H04L 45/42* (2013.01)

(58) Field of Classification Search
CPC ....... H04L 47/125; H04L 45/04; H04L 45/54; H04L 47/12; H04L 12/4633; H04L 45/00; H04L 45/64
See application file for complete search history.

(56) References Cited

U.S. PATENT DOCUMENTS

| | | | | |
|---|---|---|---|---|
| 2010/0322255 | A1* | 12/2010 | Hao | G06F 9/45558 370/398 |
| 2013/0044636 | A1* | 2/2013 | Koponen | H04L 47/12 370/254 |
| 2013/0058346 | A1* | 3/2013 | Sridharan | H04L 45/586 370/392 |
| 2014/0233569 | A1* | 8/2014 | Yong | H04L 45/64 370/392 |
| 2014/0301391 | A1* | 10/2014 | Krishnan | H04L 45/66 370/390 |
| 2015/0043581 | A1* | 2/2015 | Devireddy | H04L 49/70 370/392 |
| 2015/0063364 | A1* | 3/2015 | Thakkar | H04L 12/66 370/401 |
| 2015/0103838 | A1* | 4/2015 | Zhang | H04L 45/04 370/401 |
| 2015/0244617 | A1* | 8/2015 | Nakil | G06F 9/45558 709/224 |
| 2016/0294580 | A1 | 10/2016 | Iwata et al. | |
| 2016/0323121 | A1* | 11/2016 | Benny | H04L 45/64 |

FOREIGN PATENT DOCUMENTS

| | | |
|---|---|---|
| CN | 1665235 A | 9/2005 |
| CN | 101325551 A | 12/2008 |
| CN | 102480485 A | 5/2012 |
| CN | 102549977 A | 7/2012 |
| CN | 102740290 A | 10/2012 |
| EP | 2482496 A1 | 8/2012 |

\* cited by examiner

METHOD, DEVICE, AND SYSTEM FOR PACKET ROUTING IN A NETWORK

CROSS-REFERENCE TO RELATED APPLICATIONS

This application is a continuation of International Application No. PCT/CN2013/088710, filed on Dec. 6, 2013, which is hereby incorporated by reference in its entirety.

TECHNICAL FIELD

The present disclosure relates generally to the field of network technologies, and in particular, to a method, a device, and a system for packet routing in a network.

BACKGROUND

With the development of cloud computing technology, applying cloud computing technologies in data centers has become an inevitable trend. Compared with those in a conventional data center, access requirements and interaction traffic between resource servers (such as servers, storage devices, database hosts, etc.) in a cloud computing data center will significantly increase. This means traffic patterns will change from mainly vertical (i.e., north-to-south traffic, specifically the traffic of users accessing servers) to mainly horizontal (i.e., east-to-west traffic, specifically the traffic between servers).

Currently, to cope with the sharp increase of the east-to-west traffic in a data center, many manufacturers proposed various solutions, and one type of the solutions is shown in FIG. 1. Based on a standard network communications protocol, when a physical machine or a virtual machine in a subnet (sub-network) 1 needs to communicate with another physical machine or another virtual machine in a subnet 2, all packets need to pass through a physical gateway or virtual gateway (i.e. a level-3 router). In this solution, all data packets that communicate across subnets need to pass through the physical gateway or virtual gateway. The physical gateway or virtual gateway becomes a bottleneck for the east-to-west traffic of the data center, and a total bandwidth of the east-to-west traffic of the entire data center is limited by the physical gateway or virtual gateway. In addition, due to the limited communications bandwidth of the physical gateway or virtual gateway, as the increase of concurrent communications, communications pairs preempt the communications bandwidth of the physical gateway from each other, resulting in a sharp drop of average network bandwidth.

SUMMARY

Embodiments of the present disclosure provide a method, a device, and a system for packet routing in a network, which are aimed to effectively improve a transmission bandwidth for the east-to-west traffic.

Throughout this specification, the term "distributed routing" refers to that, when a packet is sent from a source server to a destination server, a switch directly connected to the source server and the destination server can modify a packet header of the packet according to a routing rule, so that the modified packet is forwarded at a layer-2 data link layer, and is not processed at a layer-3 routing protocol layer.

The term "distributed routing rule" refers to a routing rule that is delivered to a switch directly connected to the source server that sends the packet and/or a switch directly connected to the destination server that receives the packet, so that the switch can modify the packet header of the packet according to the routing rule. The modified packet is processed and forwarded at the layer-2 data link layer and is not processed at the layer-3 routing protocol layer.

The term "subnet" refers to a division of a large network structure that is divided into several relatively small network structures according to a certain principle (for example, according to geographical division), to facilitate network management of an administrator. In a topology view, the relatively small network structures are referred to as subnets. Each server has a subnet tag, and the subnet tag is used to identify a subnet to which the server belongs.

The term "server" generally refers to a computing device that usually executes one or more software programs in a networked environment. However, the server may further be implemented as a virtual server (i.e. a software program) executed on one or more computing devices, where the one or more computing devices are regarded as servers in a network, and the server refers to a physical machine or a virtual machine installed on a physical machine.

Terms "central control platform" and "controller" refer a process that is capable of obtaining network topology information and information of the source server and the destination server of the packet, capable of determining, according to the network topology information, whether two nodes for packet transmission meet a distributed routing requirement, and capable of creating a distributed routing rule and delivering the created distributed routing rule to one or two switches directly connected to the source server that sends the packet and the destination server that receives the packet, so that the one or two switches can perform distributed routing for the packet according to the distributed routing rule.

According to a first aspect, a method embodiment for packet routing in a network is provided, where the network includes a controller, two servers, and at least one switch, the controller is connected to at least one switch, and the at least two servers are connected to the at least one switch, and the method includes: obtaining, by the controller, identifiers of the two servers of the at least two servers and network topology information, where the network topology information includes network connection information of the two servers; and creating, by the controller, a first distributed routing rule, and sending the first distributed routing rule to a first switch directly connected to a first server, when the controller determines, by using the identifiers of the two servers and according to the network connection information of the two servers, that the two servers are in different subnets and that the two servers are under a same router where the first distributed routing rule is used to instruct the first switch to modify a packet header for a packet sent by the first server to a second server, and to forward the modified packet.

In a first possible implementation manner of the first aspect, the first distributed routing rule includes: modifying a destination Mac address of the packet sent by the first server to the second server into a Mac address of the second server.

In a second possible implementation manner of the first aspect, when the first server and the second server are two cross-switch servers, the first distributed routing rule further includes: setting a layer-2 network tag field of the packet sent by the first server to the second server to be a layer-2 network tag where the second server is located.

In a third possible implementation manner of the first aspect, in order to be transparent to a destination server for packet transmission, and to make the packet sent by the first server to the second server forwarded by a gateway to which the second server belongs from a perspective of the destination server, the first distributed routing rule further includes: modifying a source Mac address of the packet sent by the first server to the second server into a Mac address of the gateway to which the second server belongs.

In a fourth possible implementation manner of the first aspect, in order to be transparent to a destination server for packet transmission, and to make the packet sent by the first server to the second server forwarded by a gateway to which the second server belongs from a perspective of the destination server, after the controller determines that the two servers are in different subnets and that the two servers are under a same router, the controller may further create a second distributed routing rule, and when determining that a switch directly connected to the second server is a second switch different from the first switch, send the second distributed routing rule to the second switch, where the second distributed routing rule is used to instruct the second switch to forward the packet sent by the first server to the second server.

In a fifth possible implementation manner of the first aspect, the second distributed routing rule may include: modifying a source Mac address of the packet sent by the first server to the second server into a Mac address of a gateway to which the second server belongs.

In a sixth possible implementation manner of the first aspect, after the controller determines that the two servers are in different subnets and that the two servers are under a same router, in order to make a distributed routing manner also applicable to a packet sent by the second server to the first server, when the controller determines that the switch directly connected to the second server is the first switch, the controller creates a third distributed routing rule, and sends the third distributed routing rule to the first switch, where the third distributed routing rule is used to instruct the first switch to modify a packet header for the packet sent by the second server to the first server, and to forward the modified packet; and when the controller determines that the switch directly connected to the second server is a second switch different from the first switch, the controller creates a fourth distributed routing rule, and sends the fourth distributed routing rule to the second switch, where the fourth distributed routing rule is used to instruct the second switch to modify the packet header for the packet sent by the second server to the first server, and to forward the modified packet.

In a seventh possible implementation manner of the first aspect, the third distributed routing rule or the fourth distributed routing rule includes: modifying a destination Mac address of the packet sent by the second server to the first server into a Mac address of the first server; in this manner, when the packet with the modified destination Mac address passes through a switch connected to the second server, the switch directly sends the packet to a switch that matches the destination Mac address according to the destination Mac address of the packet, and directly delivers the packet to a server corresponding to the destination Mac address by using the switch; and in this way, processing by the gateway is bypassed directly, and transmission efficiency of east-to-west traffic is improved.

In an eighth possible implementation manner of the first aspect, regarding cross-switch packet forwarding, i.e., a switch connected to the first server which acts as a source server, and a switch connected to the second server which acts as a destination server, are different switches, the third distributed routing rule or the fourth distributed routing rule further includes: setting a layer-2 network tag field of the packet sent by the second server to the first server to be a layer-2 network tag where the first server is located.

In a ninth possible implementation manner of the first aspect, the third distributed routing rule or the fourth distributed routing rule further includes: modifying a source Mac address of the packet sent by the second server to the first server into a Mac address of a gateway to which the first server belongs.

In a tenth possible implementation manner of the first aspect, when determining that the switch directly connected to the first server is the first switch different from the second switch, the controller creates a fifth distributed routing rule, and sends the fifth distributed routing rule to the first switch, where the fifth distributed routing rule is used to instruct the first switch to modify the packet header for the packet sent by the second server to the first server, and to forward the modified packet.

In an eleventh possible implementation manner of the first aspect, the fifth distributed routing rule includes: modifying a source Mac address of the packet sent by the second server to the first server into a Mac address of a gateway to which the first server belongs.

In a twelfth possible implementation manner of the first aspect, the determining, by the controller, by using the identifiers of the two servers and according to the network connection information of the two servers, that the two servers are in different subnets and that the two servers are under a same router further includes: obtaining, by the controller, the identifiers of the two servers, querying, according to the identifiers, for subnet identifiers of the two servers in the network connection information of the two servers, and comparing the found subnet identifiers of the two servers, and when the two subnet identifiers are different, determining that the two servers are in different subnets; and querying, by the controller, according to the identifiers of the two servers, for identifiers of routers, to which the two servers belong, in the network connection information of the two servers, and comparing the found router identifiers of the two servers, and when the router identifiers are the same, determining that the two servers are under a same router.

According to a second aspect, a controller embodiment is further provided, which is configured to create and deliver a routing rule, where the controller includes:

an obtaining unit, configured to obtain identifiers of two servers and network topology information, where the network topology information includes network connection information of the two servers;

a triggering unit, configured to determine, by using the identifiers of the two servers and according to the network connection information of the two servers in the network topology information, that the two servers are in different subnets and that the two servers are under a same router, and enable a routing rule creating unit;

the routing rule creating unit, configured to create a first distributed routing rule, where the first distributed routing rule is used to instruct a first switch to modify a packet header for a packet sent by a first server to a second server, and to forward the modified packet; and a sending unit, configured to send the first distributed routing rule to the first switch directly connected to the first server.

In a first possible implementation manner of the second aspect, the first distributed routing rule includes: modifying a destination Mac address of the packet sent by the first server to the second server into a Mac address of the second server.

In a second possible implementation manner of the second aspect, the first distributed routing rule further includes: setting a layer-2 network tag field of the packet sent by the first server to the second server to be a layer-2 network tag where the second server is located.

In a third possible implementation manner of the second aspect, the first distributed routing rule further includes: modifying a source Mac address of the packet sent by the first server to the second server into a Mac address of a gateway to which the second server belongs.

In a fourth possible implementation manner of the second aspect, the controller further includes:

a determining unit, configured to enable the routing rule creating unit to create a second distributed routing rule when it is determined that a switch directly connected to the second server is a second switch different from the first switch, where the routing rule creating unit is further configured to create the second distributed routing rule, where the second distributed routing rule is used to instruct the second switch to modify the packet header for the packet sent by the first server to the second server, and to forward the modified packet; and the sending unit is further configured to send the second distributed routing rule to the second switch.

In a fifth possible implementation manner of the second aspect, the second distributed routing rule includes: modifying a source Mac address of the packet sent by the first server to the second server into a Mac address of a gateway to which the second server belongs.

In a sixth possible implementation manner of the second aspect, the determining unit is further configured to: when it is determined that the switch directly connected to the second server is the first switch, enable the routing rule creating unit to create a third distributed routing rule, and when it is determined that the switch directly connected to the second server is the second switch different from the first switch, enable the routing rule creating unit to create a fourth distributed routing rule;

the routing rule creating unit is further configured to create the third distributed routing rule, and create the fourth distributed routing rule, where the third distributed routing rule is used to instruct the first switch to modify a packet header for a packet sent by the second server to the first server, and to forward the modified packet, where the fourth distributed routing rule is used to instruct the second switch to modify the packet header for the packet sent by the second server to the first server, and to forward the modified packet; and the sending unit is further configured to send the third distributed routing rule to the first switch, and send the fourth distributed routing rule to the second switch.

In a seventh possible implementation manner of the second aspect, the third distributed routing rule or the fourth distributed routing rule includes: modifying a destination Mac address of the packet sent by the second server to the first server into a Mac address of the first server.

In an eighth possible implementation manner of the second aspect, the third distributed routing rule or the fourth distributed routing rule further includes: setting a layer-2 network tag field of the packet sent by the second server to the first server to be a layer-2 network tag where the first server is located.

In a ninth possible implementation manner of the second aspect, the third distributed routing rule or the fourth distributed routing rule further includes: modifying a source Mac address of the packet sent by the second server to the first server into a Mac address of a gateway to which the first server belongs.

In a tenth possible implementation manner of the second aspect, the foregoing determining unit is further configured to: when it is determined that a switch directly connected to the first server is the first switch different from the second switch, enable the routing rule creating unit to create a fifth distributed routing rule;

the foregoing routing rule creating unit is further configured to create the fifth distributed routing rule, where the fifth distributed routing rule is used to instruct the first switch to modify the packet header for the packet sent by the second server to the first server, and to forward the modified packet; and the foregoing sending unit is further configured to send the fifth distributed routing rule to the first switch.

In an eleventh possible implementation manner of the second aspect, the fifth distributed routing rule includes: modifying a source Mac address of the packet sent by the second server to the first server into a Mac address of a gateway to which the first server belongs.

In a twelfth possible implementation manner of the second aspect, the triggering unit further includes:

a first determining module, configured to query, according to the identifiers of the two servers, for subnet identifiers of the two servers in the network connection information of the two servers, and compare the found subnet identifiers of the two servers, and when the two subnet identifiers are different, determine that the two servers are in different subnets;

a second determining module, configured to query, according to the identifiers of the two servers, for identifiers of routers, to which the two servers belong, in the network connection information of the two servers, and compare the found router identifiers of the two servers, and when the router identifiers are the same, determine that the two servers are under a same router; and a triggering module, configured to enable the routing rule creating unit according to results of the first determining module and the second determining module.

According to a third aspect, a network system for packet routing in a network is further provided, where the system includes: a first server, a second server, a switch directly connected to the first server and the second server, and the controller described above.

According to a fourth aspect, a network system for packet routing in a network is further provided, where the system includes: a first server, a second server, a first switch directly connected to the first server, a second switch directly connected to the second server, and the controller described above.

Based on the foregoing technical solutions provided by the embodiments of the present disclosure, in the method, the device, and the system for packet routing in the network, a packet header of a packet sent between two servers that are under a same router and in different subnets can be modified, so that a packet that meets distributed routing conditions directly reaches a destination server after being forwarded at a layer-2 data link layer of a switch without being processed by a layer-3 router, thereby effectively improving transmission bandwidths of the east-to-west traffic.

BRIEF DESCRIPTION OF DRAWINGS

The following briefly introduces the accompanying drawings that may be needed in describing the embodiments of the present disclosure.

DETAILED DESCRIPTION OF EMBODIMENTS

The following describes the technical solutions in the embodiments of the present disclosure with reference to the accompanying drawings.

Generally, a program module includes a routine, a program, a component, a data structure, or a structure of other types, for executing a specific task or implementing a specific data type. In addition, a person skilled in the art may understand that, the embodiments may be implemented by using various computer system configurations, including handheld devices, multiprocessor systems, microprocessor-based or programmable consumer electronic products, small computers, a large computers, and similar computing devices. The embodiments may further be implemented in a distributed computing environment where a task is executed by a remote processing device linked by a communications network. In the distributed computing environment, the program module may be stored in a storage device such as a local or remote memory device.

The central control platform or controller may be implemented using hardware, or may be implemented using software programming instructions for execution by a processor in a computer system. The software programming instructions which is stored in a computer-readable storage medium, and the computer-readable storage medium may be implemented by one or more of a volatile computer memory, a non-volatile memory, a hard disk drive, a flash drive, a floppy disk or a compact disk, and a similar medium.

Figure 1:
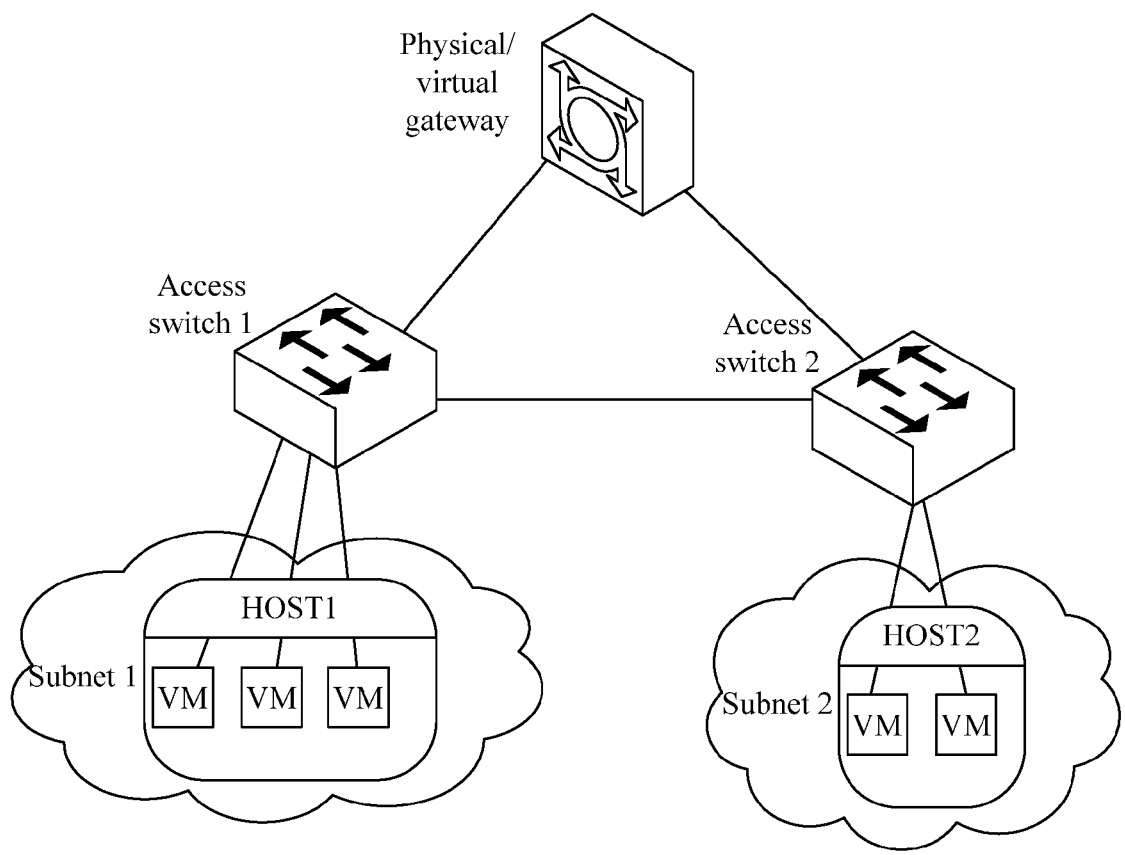
FIG. 1 is a schematic networking diagram of data center packet communication according to the prior art.
Figure 2A:
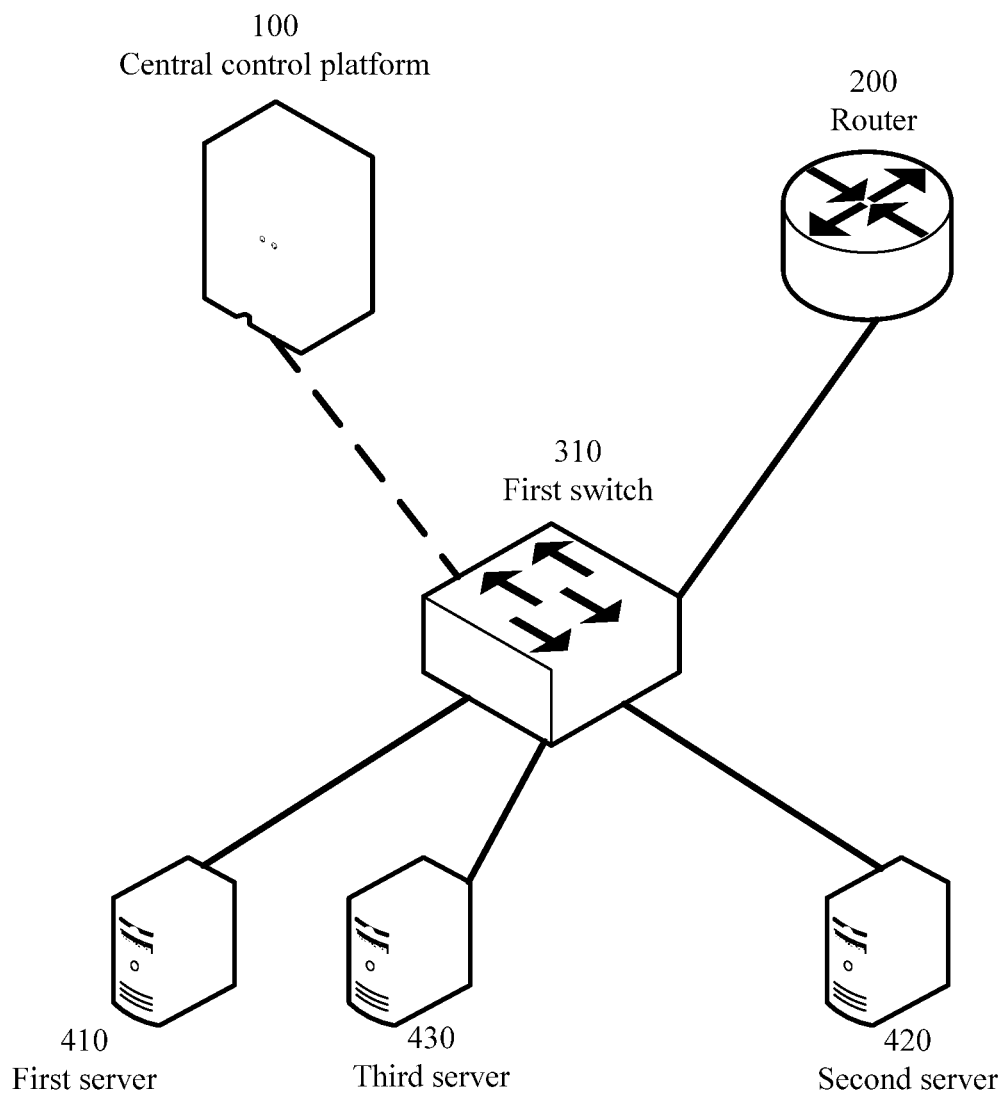
FIG. 2A is a schematic networking diagram of a system for distributed routing in a network according to a first embodiment of the present disclosure.
Figure 2B:
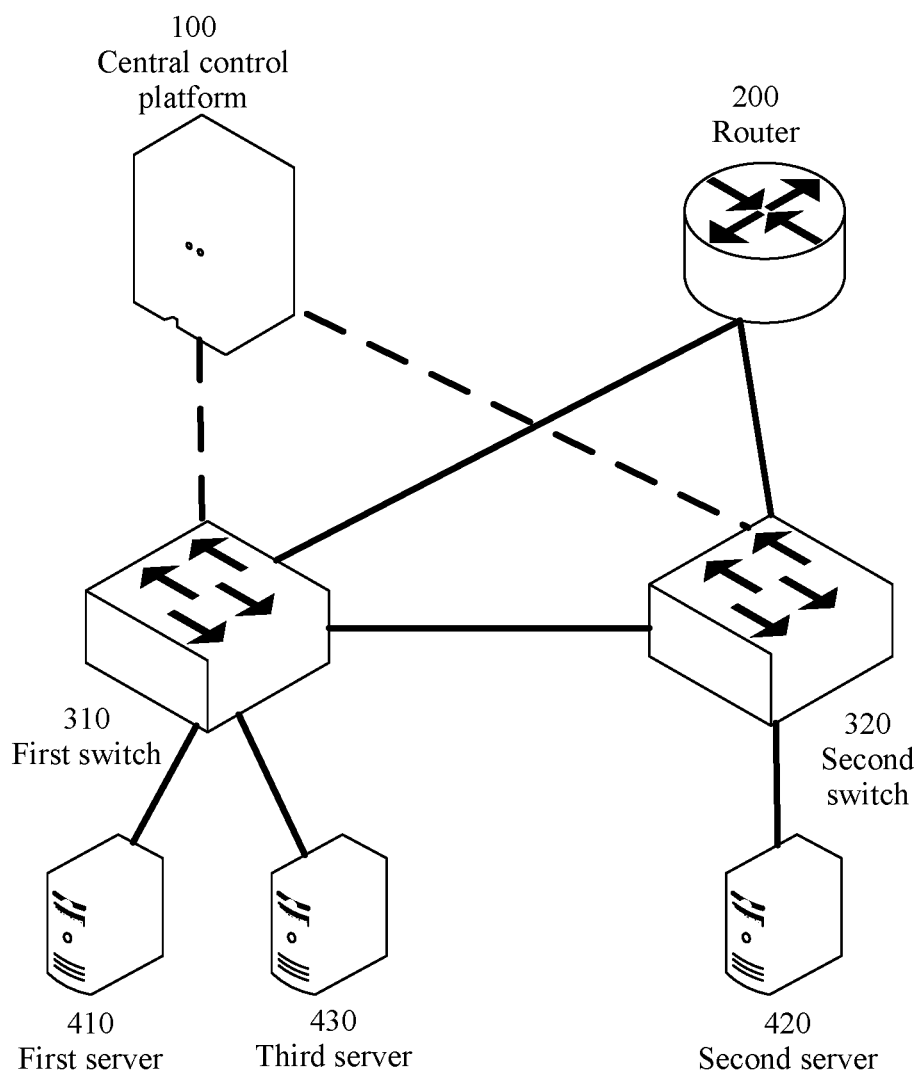
FIG. 2B is a schematic networking diagram of a system for distributed routing in a network according to a second embodiment of the present disclosure.

FIG. 2A and FIG. 2B are schematic networking diagrams of two types of systems for packet routing in a network, according to the present disclosure.

The system in FIG. 2A includes: a central control platform 100, a router 200, a first switch 310, and three servers 410, 420 and 430. The central control platform 100 is connected to the first switch 310. The router 200 is connected to the first switch 310. The first server 410, the second server 420 and the third server 430 are all connected to the first switch 310.

Compared with FIG. 2A, the system in FIG. 2B further includes a second switch 320. The central control platform 100 is additionally connected to the second switch 320, and the router 200 is additionally connected to the second switch 320. The first server 410 and the third server 430 are connected to the first switch 310, and the second server 420 is connected to the second switch 320.

The central control platform 100 in FIG. 2A or FIG. 2B is configured to construct and dynamically maintain network topology information, make a distributed routing decision, create a distributed routing rule and deliver the distributed routing rule to the first switch 310 and/or the second switch 320.

It is understandable that, in some alternative implementation manners, the central control platform 100 may not necessarily be needed to construct or dynamically maintain the network topology information, there may be another entity for constructing and dynamically maintaining the network topology information, and the central control platform 100 obtains the network topology information from the entity.

The first switch 310 and the second switch 320, as layer-2 forwarding entities, are configured to receive and execute the distributed routing rule delivered by the central control platform 100, modify a packet header for a packet which is transmitted by a source server to a destination server, and to forward the modified packet.

The central control platform 100 is further configured to: determine whether the source server that sends the packet and the destination server that receives the packet are in different subnets, and determine whether the source server and the destination server are under a same router, if both are true, create the distributed routing rule, and deliver the distributed routing rule to the first switch 310 and/or the second switch 320.

The first server 410, the second server 420, and the third server 430 act as communications entities, and in a specific implementation, the foregoing servers may refer to physical machines, or one or more virtual machines installed in the servers.

The router 200 is an entity for implementing layer-3 forwarding, and it may integrate one or more gateways.

Figure 3:
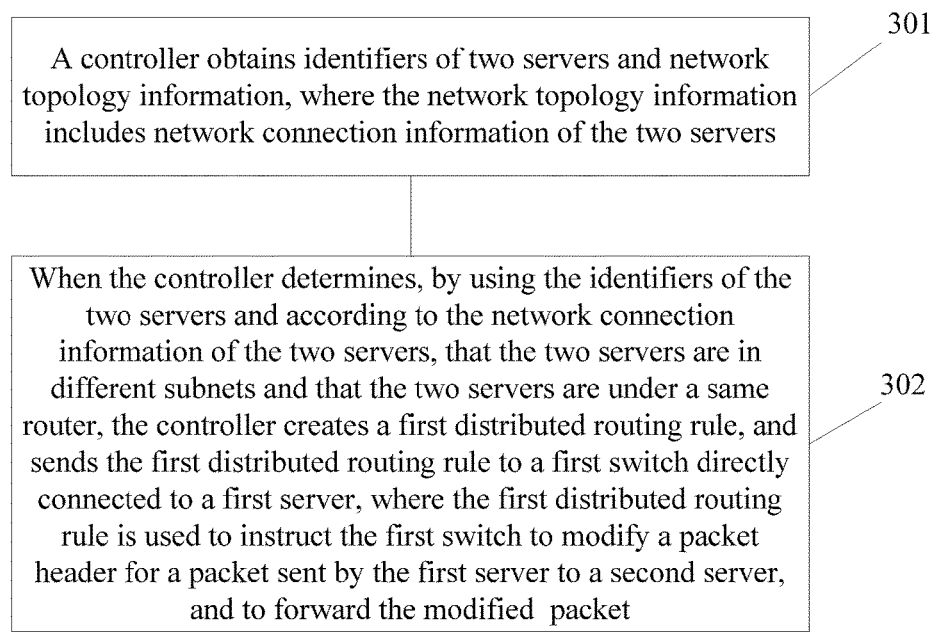
FIG. 3 is a flowchart of a method for distributed routing of a packet in a network according to embodiments of the present disclosure.
Figure 4:
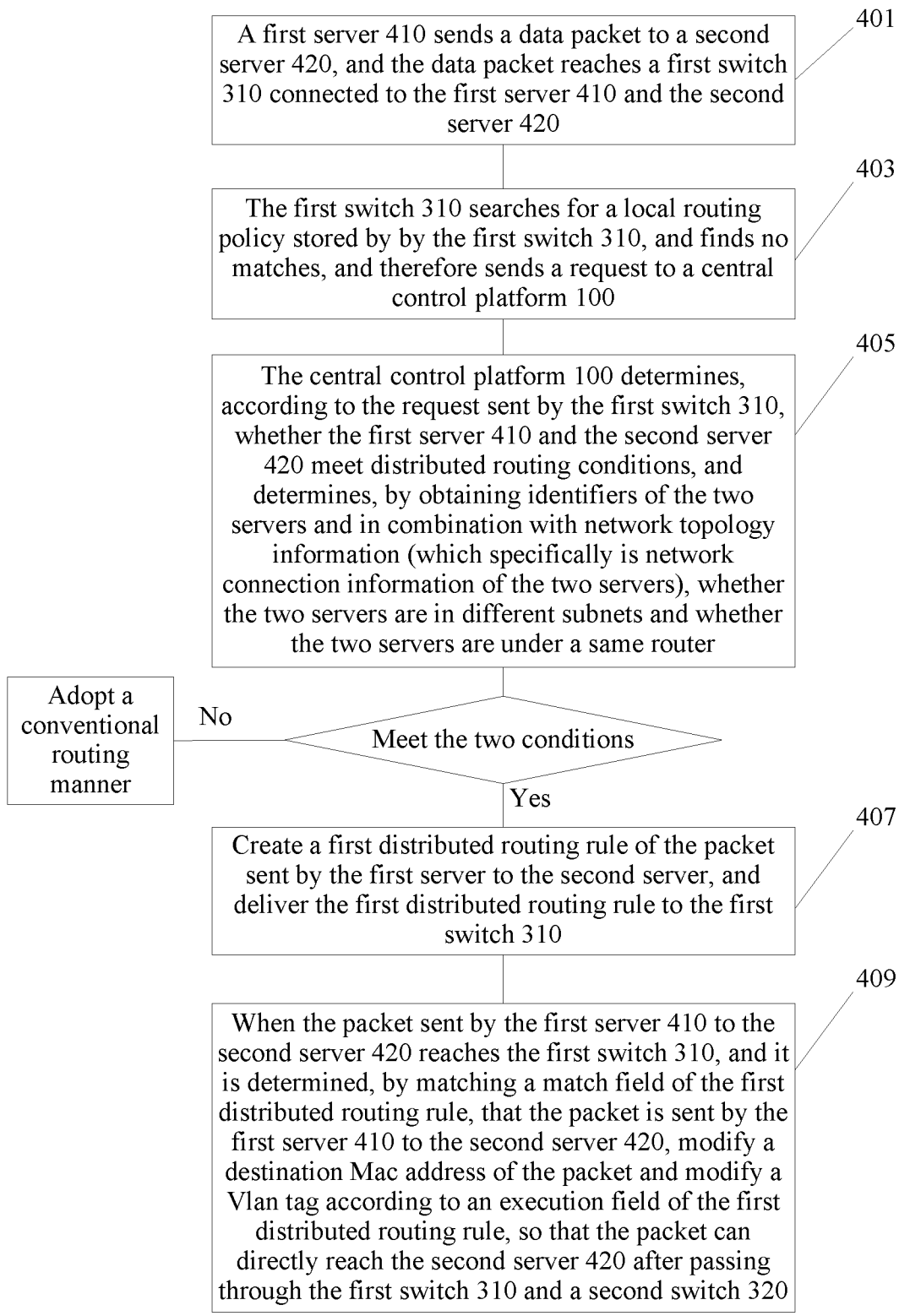
FIG. 4 is a flowchart of another method for distributed routing of a packet in a network according to embodiments of the present disclosure.
Figure 5:
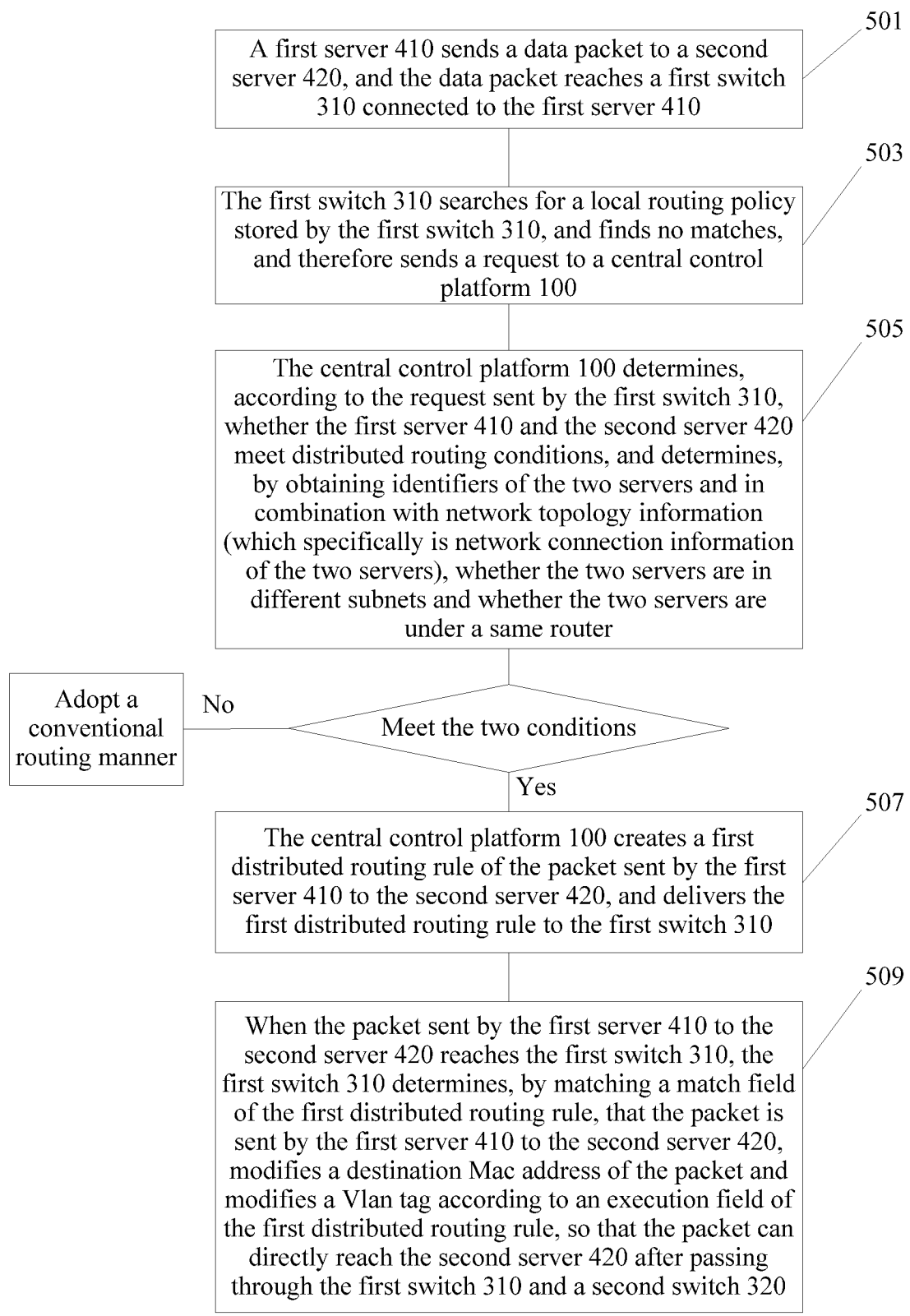
FIG. 5 is a flowchart of a yet another method for distributed routing of a packet in a network according to embodiments of the present disclosure.

FIG. 3 shows a method for distributed routing of a packet based on the foregoing network, where the network includes one controller, at least two servers, and at least one switch. The controller is connected to the at least one switch, the at least two servers are connected to the at least one switch. The network includes at least two subnets, and each server of the at least two servers belongs to a subnet of the at least two subnets.

301: The controller obtains identifiers of two servers and network topology information, where the network topology information includes network connection information of the two servers.

The controller in the step corresponds to the central control platform 100 in the foregoing system for distributed routing of a packet.

302: Based on the identifiers of the two servers and the network connection information of the two servers, the controller determines that the two servers are in different subnets, and the two servers are under a same router. The controller creates a first distributed routing rule, and sends the first distributed routing rule to a first switch directly connected to a first server. The first distributed routing rule instructs the first switch to modify a packet header of a packet that is sent by the first server to a second server, and to forward the modified packet to the second server.

By adopting the foregoing method, a controller obtains identifiers of two servers that need to send and receive a packet, and query topology information of an entire network by using the identifiers. Furthermore, the controller queries network connection information of the two servers, and determines, according to the network connection information, whether the two servers are in different subnets and whether the two servers are under a same router. When both the foregoing two conditions are met, the controller creates a distributed routing rule, and delivers the rule to a switch directly connected to a first server that sends the packet. The switch modifies, according to the delivered distributed routing rule, a header for a packet sent by the first server to a second server, so as to forward the modified packet according to the packet header. The foregoing implementation manner may be adopted to prevent all packets from passing through a router, thereby effectively improving a transmission bandwidth of the east-to-west traffic.

In a specific implementation, a process that the controller determines whether the two servers meet the distributed routing conditions may be triggered in one of the following two manners:

Manner 1: The first server of the two servers sends a packet to the second server, the packet reaches a switch directly connected to the first server, when the switch has no corresponding packet routing rule, the switch sends a routing rule request to the controller, where the request includes the identifiers of the two servers (for example, an IP address or a Mac address), and the controller determines the distributed routing conditions according to the identifiers of the two servers and the network topology information.

Manner 2: A virtual machine VM1 and a virtual machine VM2 are created separately in a host, and when the controller receives a message of creating the VM1 and the VM2, and discovers, by using identifiers of the two virtual machines, that no routing rule for packet transmission of the two virtual machines is delivered, the controller obtains the identifiers of the two virtual machines, and determines the distributed routing conditions according to the identifiers of the two virtual machines and the network topology information.

Furthermore, the first distributed routing rule includes: modifying a destination Media Access Control (MAC) address of the packet sent by the first server to the second server into a Mac address of the second server. When receiving the packet sent by the first server to the second server, the first switch modifies the destination Mac address of the packet into the Mac address of the second server, so that the packet is directly forwarded to the second server in a process that the packet is forwarded to the second server through the first switch, instead of being routed and forwarded by a gateway.

Optionally, when the two servers are under different switches, the distributed routing rule needs to include modifying a layer-2 network tag field. That is, setting the layer-2 network tag field of the packet sent by the first server to the second server to be a layer-2 network tag where the second server is located. The layer-2 network tag further is: a Vlan tag, a Vxlan tag, or the like. It is understandable that, implementation manners for the layer-2 network tag are various, and the foregoing examples do not constitute a limitation for the layer-2 network tag.

Optionally, a source Mac address of the packet sent to the second server is modified into a Mac address of a gateway to which the second server belongs. For delivering of this rule, there may be two situations according to different networking architectures of the network system:

(1) When the two servers are connected to a same switch, the rule of modifying the source Mac address of the packet sent to the second server into the Mac address of the gateway to which the second server belongs is delivered to the switch directly connected to the two servers; and (2) When the two servers are separately connected to different switches, the rule of modifying the source Mac address of the packet sent to the second server into the Mac address of the gateway to which the second server belongs may be sent to the first switch directly connected to the first server or to a second switch directly connected to the second server. When it is selected to send the rule to the second switch, it is necessary to re-create a new distributed routing rule, and deliver the routing rule to the second switch.

The foregoing implementation manner is described from a perspective of the second server, and the packet from the first server is forwarded and processed by the gateway to which the second server belongs, which is more conform to a conventional network forwarding process.

The foregoing implementation manner solves the creating and delivering of the distributed routing rule of the packet sent by the first server to the second server. Considering a bidirectional communication property of the two servers, it is necessary to create a distributed routing rule for processing the packet sent by the second server to the first server.

After the controller determines that the two servers are in different subnets and that the two servers are under a same router, the method further includes:

when the controller determines that the switch directly connected to the second server is the first switch, creating, by the controller, a third distributed routing rule, and sends the third distributed routing rule to the first switch, where the third distributed routing rule is used to instruct the first switch to modify a packet header for the packet sent by the second server to the first server, and to forward the modified packet; and when the controller determines that the switch directly connected to the second server is the second switch different from the first switch, creating, by the controller, a fourth distributed routing rule, and sends the fourth distributed routing rule to the second switch, where the fourth distributed routing rule is used to instruct the second switch to modify the packet header for the packet sent by the second server to the first server, and to forward the modified packet.

The third distributed routing rule or the fourth distributed routing rule includes: modifying a destination Mac address of the packet sent by the second server to the first server into a Mac address of the first server.

Optionally, when the second server and the first server are separately connected to different switches, the foregoing third distributed routing rule or fourth distributed routing rule further includes: setting a layer-2 network tag field of the packet sent by the second server to the first server to be a layer-2 network tag where the first server is located.

Optionally, in order to make a packet forwarding path transparent to the first server, and to make the first server consider that using the distributed routing rule to process the packet is similar to conventional routing (i.e., a gateway to which the first server belongs), the foregoing third distributed routing rule or fourth distributed routing rule further includes: modifying a source Mac address of the packet sent by the second server to the first server into a Mac address of the gateway to which the first server belongs. In this way, when the packet sent by the second server to the first server passes through the switch, the source Mac address of the packet is modified into the Mac address of the gateway to which the first server belongs.

Optionally, another manner for making the packet sent by the second server to the first server transparent to the first server is creating another distributed routing rule, that is, a fifth distributed routing rule, and delivering the fifth distributed routing rule to the switch directly connected to the first server, where the rule includes: modifying a source Mac address of the packet sent by the second server to the first server into a Mac address of a gateway to which the first server belongs.

Optionally, a process that the controller determines, by using the identifiers of the two servers and according to the network connection information of the two servers, that the two servers are in different subnets and that the two servers are under a same router further includes:

obtaining, by the controller, the identifiers of the two servers, querying, according to the identifiers, for subnet identifiers of the two servers in the network connection information of the two servers, and comparing the found subnet identifiers of the two servers, and when the two subnet identifiers are different, determining that the two servers are in different subnets; and querying, by the controller, according to the identifiers of the two servers, for identifiers of routers, to which the two servers belong, in the network connection information of the two servers, and comparing the found router identifiers of the two servers, and when the router identifiers are the same, determining that the two servers are under a same router.

In the foregoing embodiment, a communications protocol adopted by the controller and the switch includes, but is not limited to: an Openflow protocol or a Secure Shell protocol.

In order to describe the process of creating and delivering of the distributed routing rule more clearly, four specific embodiments are used below to describe the creating and delivering of the distributed routing rule:

(I) Passively Creating a Distributed Routing Rule

1) Based on the network architecture in FIG. 2A

401: A first server 410 sends a data packet to a second server 420, and the data packet reaches a first switch 310 connected to the first server 410 and the second server 420. Furthermore, a header of the data packet includes the following quintuple information:

| Source Mac | Destination Mac | Ethernet type | Source IP | Destination IP |
|---|---|---|---|---|
| Mac of the first server | Mac of a gateway of the first server | 0x0800 | IP of the first server | IP of the second server |

A destination Mac address of the data packet is a Mac address of a gateway to which the first server belongs. That is, according to conventional routing, a next hop of the data packet is a gateway of a subnet to which the first server belongs.

The Ethernet type in the foregoing table is added by the first server according to a transmission network type. It is understandable that, the Ethernet type may also be another network type, which is not limited herein by the embodiment of the present disclosure.

403: The first switch 310 searches for a local routing policy stored by the first switch 310, and finds no matches, and therefore sends a request to the central control platform 100.

The routing policy adopts a structure of "match field+ execution field", where the match field includes information about the source server and the destination server, and the information may include an IP address, a Mac address, or the like. In a process of implementing step 403, it is determined, by using a matching mode of the match field, whether the routing policy required to be matched can be found.

405: The central control platform 100 determines, according to the request sent by the first switch 310, whether the first server 410 and the second server 420 meet distributed routing conditions, and determines, by obtaining the identifiers of the two servers and in combination with the network topology information (which further is the network connection information of the two servers), whether the two servers are in different subnets and whether the two servers are under a same router; and when the foregoing two conditions are met, performs step 407; and otherwise, creates a routing rule in a conventional manner.

A process of determining whether the first server 410 and the second server 420 meet the distributed routing conditions further includes:

The central control platform 100 obtains identifiers (for example, IP addresses or Mac addresses) of the first server 410 and the second server 420, queries, according to the foregoing identifiers, for subnet identifiers (subnet_id) of the two servers in the network connection information of the two servers, and compares the found subnet identifiers of the two servers, and when the two subnet identifiers are different, determines that the two servers are in different subnets.

The central control platform 100 queries, according to the identifiers of the two servers, for identifiers of routers (Router_id), to which the two servers belong, in the network connection information of the two servers, and compares the found router identifiers of the two servers, and when the router identifiers are the same, determines that the two servers are under a same router.

407: Create a first distributed routing rule of the packet sent by the first server to the second server, and deliver the first distributed routing rule to the first switch 310, where the rule is as follows:

| Match field | | | | | Execution field |
|---|---|---|---|---|---|
| Src_Mac | Dst_Mac | Ethernet_type | Src_IP | Dst_IP | Actions |
| Mac of the first server | Mac of a gateway to which the first switch belongs | 0x0800 | IP of the first server | IP of the second server | Mod_Dst_Mac = Mac of the second server Mod_Src_Mac = Mac of a gateway to which the second server belongs |

It should be noted that, the two execution rules included in the execution field are a preferred embodiment. In a specific implementation process, it is necessary to modify a destination Mac address of the packet, that is, "Mod_Dst_Mac=Mac of the second server"; and it is optional to modify the source Mac address of the packet, that is, "Mod_Src_Mac=Mac of a gateway to which the second server belongs".

409: When the packet sent by the first server 410 to the second server 420 reaches the first switch 310, and it is determined, by matching the match field of the first distributed routing rule, that the packet is sent by the first server 410 to the second server 420, modify the destination Mac address of the packet and modify a Vlan tag according to the execution field of the first distributed routing rule, so that the packet can directly reach the second server 420 after passing through the first switch 310.

It should be noted that, the foregoing match field structure of the first distributed routing rule is merely a specific example. It is understandable that, the match field of the distributed routing rule described in the embodiments of the specification may be implemented in another manner. For example, the match field only includes an IP of a source server and an IP of a destination server, which is not limited by any embodiment of the present disclosure.

In the embodiment of the present disclosure, the controller determines whether information about the packet sent by the first server 410 to the second server 420 meets the distributed routing conditions, where the distributed routing conditions further are: determining whether the source server that sends the packet and the destination server that receives the packet are in different subnets, and whether the two servers are under a same router. If the foregoing distributed routing conditions are met, the distributed routing rule is delivered to the switch directly connected to the two servers. The switch that receives the distributed routing rule forwards and processes the foregoing packet by modifying the destination Mac of the packet into the Mac of the destination server. In this way, it is avoided that all packets need to be forwarded by using a layer-3 routing protocol, and pressure of a router, which has a gateway function, on packet forwarding is significantly reduced.

The foregoing process is creating the distributed routing rule for the packet sent by the first server 410 to the second server 420, to forward the packet. A person of ordinary skill in the art can understand that, regarding distributed routing for a packet sent by the second server 420 to the first server 410, the controller may create a corresponding distributed routing rule in a similar way to forward the packet sent by the second server 420 to the first server 410, and details are not be described herein again.

A situation where two servers are connected to one switch is described above, and a distributed routing manner of the packet is described below by using that two servers are separately connected to two switches as example.

2) Based on the network architecture in FIG. 2B

501: A first server 410 sends a data packet to a second server 420, and the data packet reaches a first switch 310 connected to the first server 410. A header of the data packet includes the following quintuple information:

| Source Mac | Destination Mac | Ethernet type | Source IP | Destination IP |
| --- | --- | --- | --- | --- |
| Mac of the first server | Mac of a gateway of | 0x0800 | IP of the first | IP of the second |

| Source Mac | Destination Mac | Ethernet type | Source IP | Destination IP |
| --- | --- | --- | --- | --- |
| the first server | | | server | server |

A destination Mac address of the data packet is a Mac address of a gateway to which the first server belongs. That is, according to conventional routing, a next hop of the data packet is a gateway to which the first server belongs.

The Ethernet type in the foregoing table is added by the first server according to a transmission network type. It is understandable that, the Ethernet type may also be another network type, which is not limited herein by the embodiment of the present disclosure.

503: The first switch 310 searches for a local routing policy stored by the first switch 310, and finds no matches, and therefore sends a request to the central control platform 100.

The routing policy adopts a structure of "match field+ execution field", where the match field includes information about the source server and the destination server, and the information may include an IP address, a Mac address, or the like. In a process of implementing step 503, it is determined, by using a matching mode of the match field, whether the routing policy required to be matched can be found.

505: The central control platform 100 determines, according to the request sent by the first switch 310, whether the first server 410 and the second server 420 meet distributed routing conditions, and determines, by obtaining the identifiers of the two servers and in combination with the network topology information (which further is the network connection information of the two servers), whether the two servers are in different subnets and whether the two servers are under a same router; and when the foregoing two conditions are met, performs step 507; and otherwise, creates a routing rule in a conventional manner.

A process of determining whether the first server 410 and the second server 420 meet the distributed routing conditions further includes:

The central control platform 100 obtains identifiers (for example, IP addresses or Mac addresses) of the first server 410 and the second server 420, queries, according to the foregoing identifiers, for subnet identifiers (subnet_id) of the two servers in the network connection information of the two servers, and compares the found subnet identifiers of the two servers, and when the two subnet identifiers are different, determines that the two servers are in different subnets.

The central control platform 100 queries, according to the identifiers of the two servers, for identifiers of routers (Router_id), to which the two servers belong, in the network connection information of the two servers, and compares the found router identifiers of the two servers, and when the router identifiers are the same, determines that the two servers are under a same router.

507: The central control platform 100 creates a first distributed routing rule of the packet sent by the first server 410 to the second server 420, and delivers the first distributed routing rule to the first switch 310, where the rule is as follows:

| Match field | | | | | Execution field |
|---|---|---|---|---|---|
| Src_Mac | Dst_Mac | Ethernet_type | Src_IP | Dst_IP | Actions |
| Mac of the first server | Mac of a gateway to which the first switch belongs | 0x0800 | IP of the first server | IP of the second server | Mod_Dst_Mac = Mac of the second server<br>Mod_Vlan_vid = Vlan of the second server<br>Mod_Src_Mac = Mac of a gateway to which the second server belongs |

In the execution field of the first distributed routing rule delivered to the first switch 310, it is necessary to modify a source Mac address of the packet into a Mac address of the second server used as a destination packet receiving end, that is, "Mod_Dst_Mac=Mac of the second server". It is known from FIG. 2B that, the first server 410 and the second server 420 are separately connected to different switches. That is, it is necessary to modify a layer-2 network tag in the packet sent by two servers that communicate by crossing switches, and in this embodiment, it is necessary to modify a Vlan tag. That is, "Mod_Vlan_vid=Vlan of the second server" is also necessary. In addition, it is optional to modify the source Mac address of the packet, that is, "Mod_Src_Mac=Mac of a gateway to which the second server belongs".

As another transformation, for an instruction of "Mod_Src_Mac=Mac of a gateway to which the second server belongs", a second distributed routing rule may further be created independently, and the rule is delivered to the second switch 320 directly connected to the second server 420, where the second distributed routing rule is shown as follows:

destination Mac address of the packet and modifies a Vlan tag according to the execution field of the first distributed routing rule, so that the packet can directly reach the second server 420 after being forwarded at a layer-2 data link layer of the first switch 310 and the second switch 320.

In the embodiment of the present disclosure, the controller determines whether information about the packet sent by the first server 410 to the second server 420 meets the distributed routing conditions, where the distributed routing conditions further are: determining whether the source server that sends the packet and the destination server that receives the packet are in different subnets, and whether the two servers are under a same router. If the foregoing distributed routing conditions are met, the distributed routing rule is delivered to the switch connected to the two servers. The switch that receives the distributed routing rule forwards and processes the foregoing packet by modifying the destination Mac of the packet into the Mac of the destination server. It is avoided that all packets need to be forwarded by using a layer-3 router, and pressure of a router, which has a gateway function, on packet forwarding is significantly reduced.

| Match field | | | | | Execution field |
|---|---|---|---|---|---|
| Src_Mac | Dst_Mac | Ethernet_type | Src_IP | Dst_IP | Actions |
| Mac of the first server | Mac of a gateway to which the first switch belongs | 0x0800 | IP of the first server | IP of the second server | Mod_Src_Mac = Mac of a gateway to which the second server belongs |

In addition, the first distributed routing rule including "Mod_Dst_Mac=Mac of the second server" and "Mod_vlan_vid=Vlan of the second server" is delivered to the first switch 310. That is, the distributed routing rule as follows is delivered to the first switch 310:

A process of creating and delivering the distributed routing rule is described above in a manner that the first server 410 sends the packet to the second server 420, and a process of creating and delivering a distributed routing rule for a packet sent by the second server 420 to the first server 410

| Match field | | | | | Execution field |
|---|---|---|---|---|---|
| Src_Mac | Dst_Mac | Ethernet_type | Src_IP | Dst_IP | Actions |
| Mac of the first server | Mac of a gateway to which the first switch belongs | 0x0800 | IP of the first server | IP of the second server | Mod_Dst_Mac = Mac of the second server<br>Mod_vlan_vid = Vlan of the second server |

509: When the packet sent by the first server 410 to the second server 420 reaches the first switch 310, the first switch 310 determines, by matching the match field of the first distributed routing rule, that the packet is sent by the first server 410 to the second server 420, modifies the is similar to the foregoing process, and details are not described again in the embodiment of the present disclosure.

In the foregoing "manner of passively creating a distributed routing rule", the manner is referred to be "passive" because the central control platform 100 only initiates the process of creating the distributed routing rule after receiving information about the packet sent by the source server to the destination server and determining that no routing rule is created.

(II) Actively Creating a Distributed Routing Rule

Figure 6A:
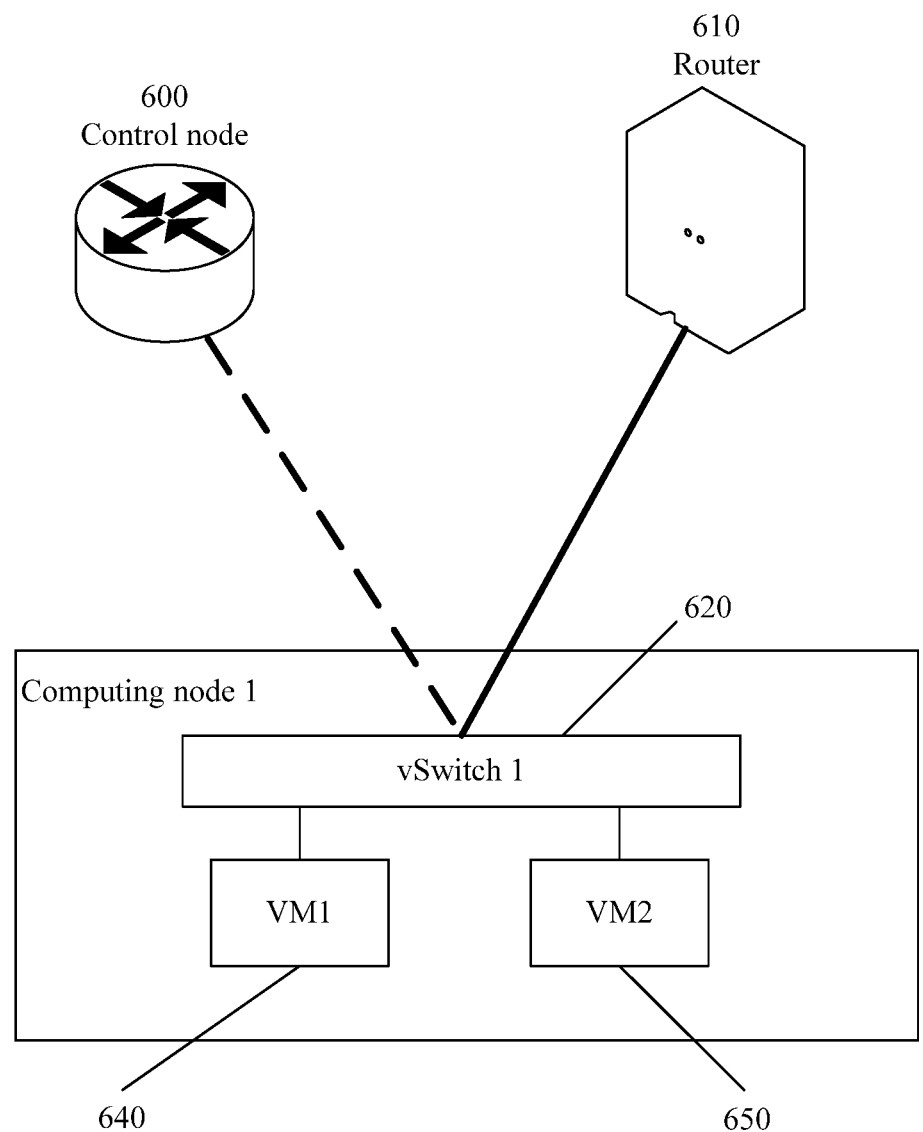
FIG. 6A is a schematic networking diagram of a system for distributed routing in a network according to a third embodiment of the present disclosure.
Figure 6B:
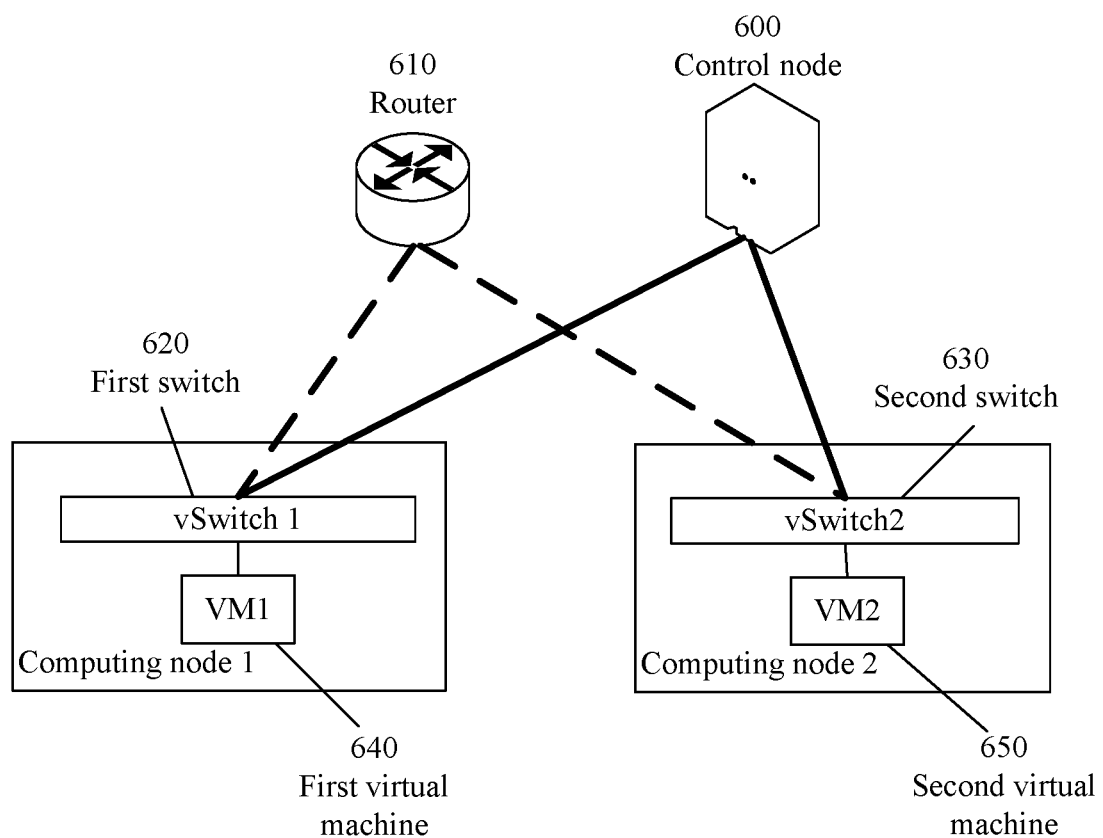
FIG. 6B is a schematic networking diagram of a system for distributed routing in a network according to a fourth embodiment of the present disclosure.

In FIG. 6A and FIG. 6B, a vSwitch refers to a virtual switch, and a VM refers to a virtual machine. In a specific implementation process, the vSwitch may be a logical entity, and may be in a same physical entity together with the VM.

A process of creating and delivering a distributed routing rule is described below by using an Openstack scenario. Referring to FIG. 6A, the method includes:

601: Create a VM1 640 in a computing node 1, and in this case, network topology information under a vSwitch1 620 is changed.

602: The computing node 1 detects that the network topology information is changed and reports the change to a control node 600.

603: The control node 600 updates the network topology information.

604: Create a VM2 650 in the computing node 1, and the computing node 1 detects that the network topology information is changed and reports the change to the control node 600.

605: The control node 600 discovers, according to the network topology information, that two VMs are created, and determines whether the VM1 640 and the VM2 650 are under a same router and whether the VM1 640 and the VM2 650 are in different subnets.

606: When it is determined that both the foregoing two conditions are met, the control node 600 creates two distributed routing rules separately. A first distributed routing rule is used to route and forward a packet sent by the VM1 640 to the VM2 650, and a second distributed routing rule is used to route and forward a packet sent by the VM2 650 to the VM1 640.

The first distributed routing rule is:

| Match field | | | | | Execution field |
| --- | --- | --- | --- | --- | --- |
| Mac_Src | Mac_Dst | Ethernet Type | IP_Src | IP_Dst | Actions |
| Mac of VM1 | Mac of a gateway to which VM1 belongs | 0x0800 | IP of VM1 | IP of VM2 | Mod_Mac_Dst = VM2 Mac Mod_Mac_Src = VM2 GW Mac |

In the foregoing rule, "Mod_Mac_Dst=VM2 Mac" means modifying a destination Mac address of the packet into a Mac address of the VM2 650, and the rule is mandatory.

"Mod_Mac_Src=VM2 GW Mac" means modifying a source Mac address of the packet into a Mac address of a gateway to which the VM2 650 belongs, and the rule is optional.

Similarly, the second distributed routing rule is:

| Match field | | | | | Execution field |
| --- | --- | --- | --- | --- | --- |
| Mac_Src | Mac_Dst | Ethernet Type | IP_Src | IP_Dst | Actions |
| Mac of VM2 | Mac of a gateway to which VM2 belongs | 0x0800 | IP of VM2 | IP of VM1 | Mod_Mac_Dst = VM1 Mac Mod_Mac_Src = VM1 GW Mac |

In the foregoing rule, "Mod_Mac_Dst=VM1 Mac" means modifying a destination Mac address of the packet into a Mac address of the VM1, and the rule is mandatory.

"Mod_Mac_Src=VM1 GW Mac" means modifying a source Mac address of the packet into a Mac address of a gateway to which the VM1 belongs, and the rule is optional.

607: The control node 600 delivers the two created routing rules to the vSwitch1 620.

After the foregoing process, for the packet sent by the VM1 to the VM2 and the packet sent by the VM2 to the VM1, distributed routing and forwarding of the packets can be implemented by using the two foregoing routing rules.

It is understandable that, in the foregoing embodiment shown in FIG. 6A, the vSwitch1, the VM1, and the VM2 are logical entities with different functions. In a specific implementation process, the vSwitch1 and the VM1 may be implemented in a same physical entity, or the vSwitch1 and the VM2 may be implemented in a same physical entity, or the vSwitch1, the VM1 and the VM2 may be implemented in a same physical entity, which is not limited by any embodiment of the present disclosure.

The foregoing embodiment is for a situation where two VMs are connected to a same vSwitch, and the following embodiment describes a situation where two VMs are separately connected to two vSwitches, referring to FIG. 6B:

701: Create a VM1 640 in a computing node 1, and in this case, network topology information under a vSwitch1 620 is changed;

702: The computing node 1 detects that the network topology information is changed and reports the change of the network topology to a control node 600;

703: The control node 600 updates the network topology information;

704: Create a VM2 650 in a computing node 2, and the computing node 2 detects that the network topology information is changed and reports the change to the control node 600;

705: The control node 600 discovers, according to the network topology information, that two VMs are created, and determines, by using identifiers of the two VMs and according to the network topology information, whether the VM1 640 and the VM2 650 are under a same router and whether the VM1 640 and the VM2 650 are in different subnets;

706: When it is determined that both the foregoing two conditions are met, the control node 600 creates two distributed routing rules separately. A first distributed routing rule is used to route and forward a packet sent by the VM1 640 to the VM2 650, and a second distributed routing rule is used to route and forward a packet sent by the VM2 650 to the VM1 640.

The first distributed routing rule is:

| Match field | | | | | Execution field |
|---|---|---|---|---|---|
| Mac_Src | Mac_Dst | Ethernet Type | IP_Src | IP_Dst | Actions |
| Mac of VM1 | Mac of a gateway to which VM1 belongs | 0x0800 | IP of VM1 | IP of VM2 | Mod_Mac_Dst = VM2 Mac<br>Mod_Vlan_vid = VM2 Vlan<br>Mod_Mac_Src = VM2 GW Mac |

In the foregoing rule, "Mod_Mac_Dst=VM2 Mac" means modifying a destination Mac address of the packet into a Mac address of the VM2, and the rule is mandatory. "Mod_Vlan_vid=VM2 Vlan" means modifying a Vlan tag of the packet into a Vlan tag where the VM2 is located, and the rule is also mandatory. "Mod_Mac_Src=VM2 GW Mac" means modifying a source Mac address of the packet into a Mac address of a gateway to which the VM2 belongs, and the rule is optional. An objective is to make a forwarding process of the packet distributed routing transparent to the VM2. That is, it seems to the VM2 that the packet is forwarded to the VM2 by the gateway to which VM2 belongs, which is the same as that in a conventional routing manner.

Similarly, the second distributed routing rule is:

| Match field | | | | | Execution field |
|---|---|---|---|---|---|
| Mac_Src | Mac_Dst | Ethernet Type | IP_Src | IP_Dst | Actions |
| Mac of VM2 | Mac of a gateway to which VM2 belongs | 0x0800 | IP of VM2 | IP of VM1 | Mod_Mac_Dst = VM1 Mac<br>Mod_Mac_Src = VM1 GW Mac |

In the foregoing rule, "Mod_Mac_Dst=VM1 Mac" means modifying a destination Mac address of the packet into a Mac address of the VM1, and the rule is mandatory.

"Mod_Mac_Src=VM1 GW Mac" means modifying a source Mac address of the packet into a Mac address of a gateway to which the VM1 belongs, and the rule is optional.

707: The control node 600 delivers the created first distributed routing rule deliver to the vSwitch1, and delivers the created second distributed routing rule to a vSwitch2.

In the embodiment shown in FIG. 6B, the vSwitch1 and the VM1, and the vSwitch2 and the VM2 are different logical entities respectively. In a specific implementation process, the vSwitch1 and the VM1 may be implemented in a same physical entity, and the vSwitch2 and the VM2 may be implemented in a same physical entity, which are not limited by any embodiment of the present disclosure.

By adopting the foregoing method embodiment, a controller obtains identifiers of newly created VMs, and determines, by using the identifiers and by querying topology information of the entire network, whether the two VMs are in different subnets and whether the two VMs are under a same router. When both the foregoing two conditions are met, the controller creates a distributed routing rule, and delivers the rule to a switch directly connected to the VM that sends the packet. The switch processes, according to the delivered distributed routing rule, a packet sent by a first VM to a second VM. The foregoing implementation manner may be adopted to prevent all packets from passing through a router with a gateway function, thereby effectively improving a transmission bandwidth of east-to-west traffic.

Figure 7:
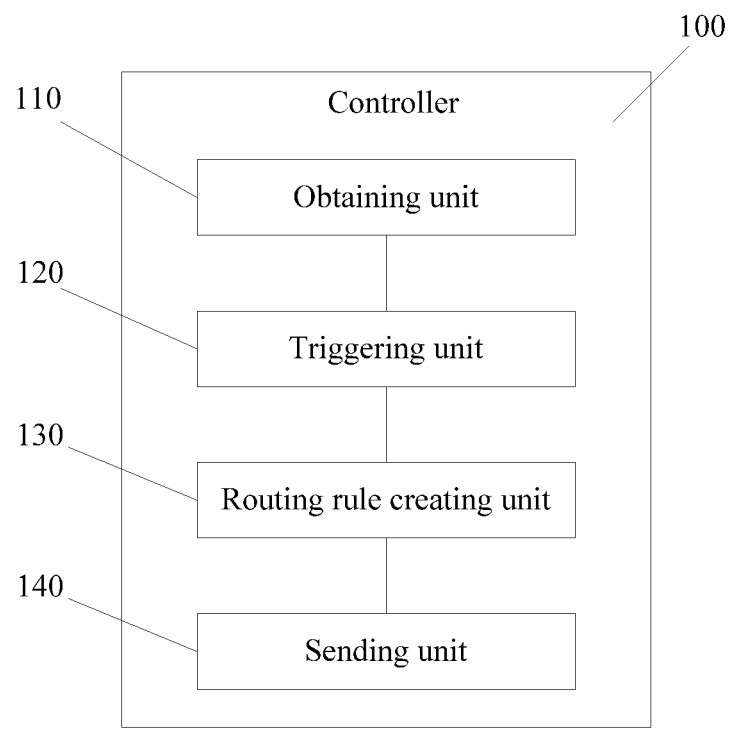
FIG. 7 is a block diagram of a controller according to embodiments of the present disclosure.
Figure 8:
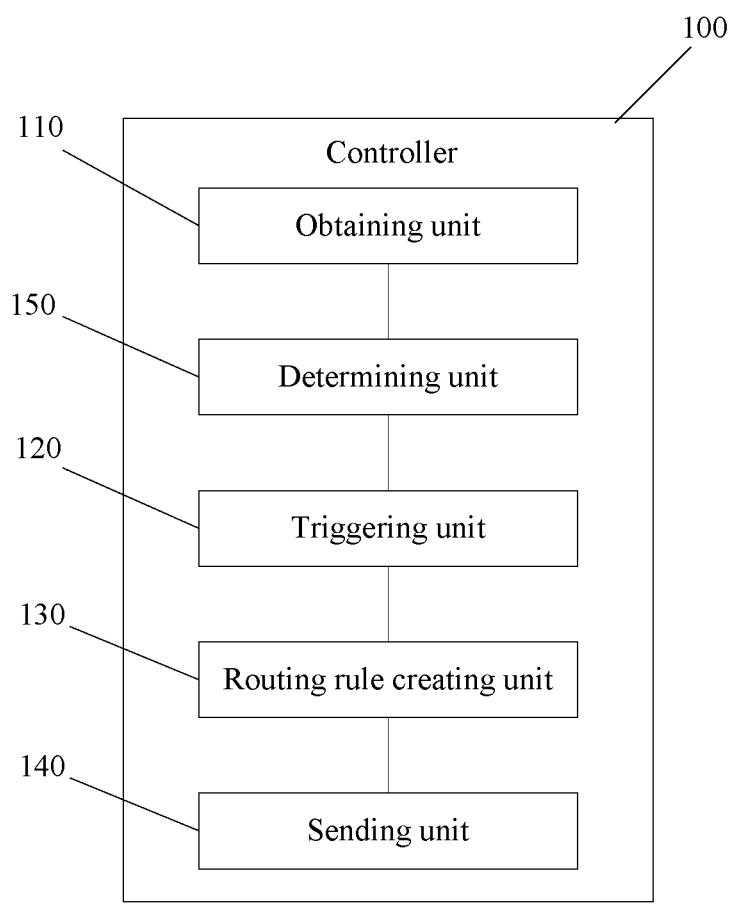
FIG. 8 is a block diagram of another controller according to embodiments of the present disclosure.

Another embodiment of the present disclosure provides a controller, where the controller is configured to implement distributed routing of a packet in a network. As shown in FIG. 7, the controller 100 includes:

an obtaining unit 110, configured to obtain identifiers of two servers and network topology information, where the network topology information includes network connection information of the two servers;

a triggering unit 120, configured to determine, by using the identifiers of the two servers and according to the network connection information of the two servers in the network topology information, that the two servers are in different subnets and that the two servers are under a same router, enable a routing rule creating unit 130;

the routing rule creating unit 130, configured to create a first distributed routing rule, where the first distributed routing rule is used to instruct a first switch to modify a packet header for a packet sent by a first server to a second server, and to forward the modified packet; and a sending unit 140, configured to send the first distributed routing rule to the first switch directly connected to the first server.

The first distributed routing rule includes: modifying a destination Mac address of the packet sent by the first server to the second server into a Mac address of the second server.

Optionally, the first distributed routing rule further includes: setting a layer-2 network tag field of the packet sent by the first server to the second server to be a layer-2 network tag where the second server is located.

Optionally, the first distributed routing rule further includes:

modifying a source Mac address of the packet sent by the first server to the second server into a Mac address of a gateway to which the second server belongs.

Optionally, the controller 100 further includes:

a determining unit 150, configured to enable the routing rule creating unit to create a second distributed routing rule when it is determined that a switch connected to the second server is a second switch different from the first switch, where the routing rule creating unit 130 is further configured to create the second distributed routing rule, where the second distributed routing rule is used to instruct the second switch to modify the packet header for the packet sent by the first server to a second server, and to forward the modified packet; and the sending unit 140 is further configured to send the second distributed routing rule to the second switch.

The second distributed routing rule includes:

modifying a source Mac address of the packet sent by the first server to the second server into a Mac address of a gateway to which the second server belongs.

Regarding a process of creating the distributed routing rule for the packet sent by the first server to the second server, and for two situations where the first server and the second server are connected to the first switch, and the first server is connected to the first switch and the second server is connected to the second switch.

The determining unit 150 in the foregoing controller 100 is further configured to: when it is determined that the switch directly connected to the second server is the first switch, enable the routing rule creating unit to create a third distributed routing rule, and when it is determined that the switch directly connected to the second server is the second switch different from the first switch, enable the routing rule creating unit to create a fourth distributed routing rule.

The routing rule creating unit 130 in the foregoing controller 100 is further configured to create the third distributed routing rule, and create the fourth distributed routing rule, where the third distributed routing rule is used to instruct the first switch to modify a packet header for a packet sent by the second server to the first server, and to forward the modified packet, where the fourth distributed routing rule is used to instruct the second switch to modify the packet header for the packet sent by the second server to the first server, and to forward the modified packet.

The sending unit 140 is further configured to send the third distributed routing rule to the first switch, and send the fourth distributed routing rule to the second switch.

The third distributed routing rule or the fourth distributed routing rule includes:

modifying a destination Mac address of the packet sent by the second server to the first server into a Mac address of the first server.

Optionally, the third distributed routing rule or the fourth distributed routing rule further includes:

setting a layer-2 network tag field of the packet sent by the second server to the first server to be a layer-2 network tag where the first server is located.

Optionally, the third distributed routing rule or the fourth distributed routing rule further includes:

modifying a source Mac address of the packet sent by the second server to the first server into a Mac address of a gateway to which the first server belongs.

Regarding distributed routing for the packet sent by the second server to the first server, the determining unit 150 included in the controller 100 is further configured to: when it is determined that a switch directly connected to the first server is the first switch different from the second switch, enable the routing rule creating unit to create a fifth distributed routing rule.

The routing rule creating unit 130 is further configured to create the fifth distributed routing rule, where the fifth distributed routing rule is used to instruct the first switch to modify the packet header for the packet sent by the second server to the first server, and to forward the modified packet.

The sending unit 140 is further configured to send the fifth distributed routing rule to the first switch.

The fifth distributed routing rule includes: modifying a source Mac address of the packet sent by the second server to the first server into a Mac address of a gateway to which the first server belongs.

Figure 9:
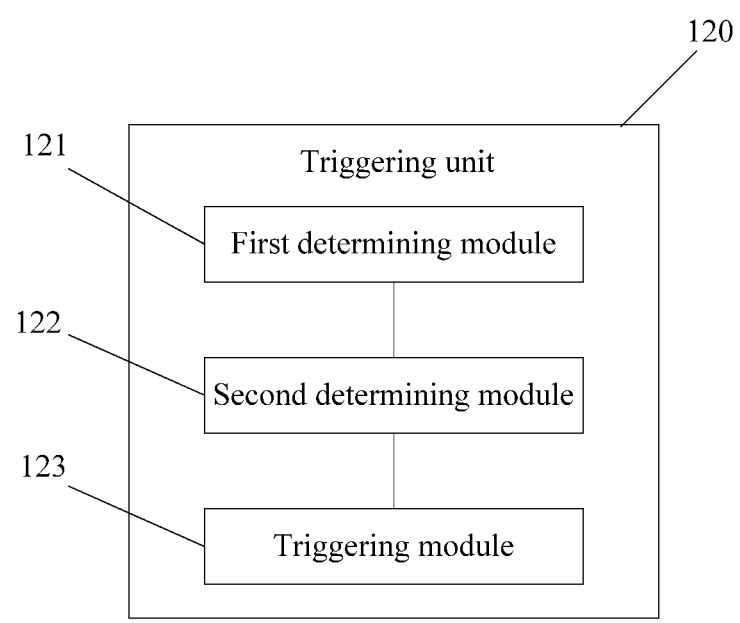
FIG. 9 is a block diagram of a triggering unit in a controller according to embodiments of the present disclosure.

Further, referring to FIG. 9, the triggering unit 120 further includes:

a first determining module 121, configured to query, according to the identifiers of the two servers, for subnet identifiers of the two servers in the network connection information of the two servers, and compare the found subnet identifiers of the two servers, and when the two subnet identifiers are different, determine that the two servers are in different subnets;

a second determining module 122, configured to query, according to the identifiers of the two servers, for identifiers of routers, to which the two servers belong, in the network connection information of the two servers, and compare the found router identifiers of the two servers, and when the router identifiers are the same, determine that the two servers are under a same router; and a triggering module 123, configured to enable the routing rule creating unit according to results of the first determining module and the second determining module.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for packet routing in a network, comprising:
    obtaining, by a controller, identifiers of two servers in the network and network connection information of the two servers;
    determining, by the controller, whether the two servers are in two different subnets of the network and whether the two different subnets are configured on a same router according to the identifiers of the two servers and the network connection information of the two servers;
    when it is determined that the two servers are in two different subnets of the network and the two different subnets are configured on a same router, instructing, by the controller, a first switch to: modify a packet header of a packet sent by a first server to a second server and forward the modified packet to the second server;
    wherein the network comprises the controller, the two servers, and the first switch, and
    wherein the two servers comprise the first server and the second server, the controller is connected to the first switch, the first server is directly connected to the first switch, the first server belongs to a first subnet of the network, and the second server belongs to a second subnet of the network.

2. The method according to claim 1, wherein the step of instructing the first switch to modify a packet header of a packet comprises:
    instructing the first switch to change a destination MAC address of the packet into a MAC address of the second server.

3. The method according to claim 2, wherein the step of instructing the first switch to modify a packet header of a packet further comprises:
    instructing the first switch to set a layer-2 network tag field of the packet to be a layer-2 network tag where the second server is located.

4. The method according to claim 1, wherein the network further comprises a second switch which is connected to the controller, the second switch is directly connected to the second server, and the second switch communicates with the first switch through other network elements in the network, and the method further comprises:
    when it is determined that that the two servers are in two different subnets of the network and the two different subnets are configured on a same router, instructing, by the controller, the second switch to: modify the packet header for the packet sent by the first server to the second server, and forward the modified packet to the second server.

5. The method according to claim 4, wherein the step of instructing the second switch to modify the packet header for the packet comprises:
    instructing the second switch to modify a source MAC address of the packet into a MAC address of a gateway corresponding to the second subnet.

6. A computer program product comprising a non-transitory computer readable medium storing program codes thereon for execution by a network controller, wherein the program codes comprise instructions for performing a process that comprises:
    obtaining identifiers of the two servers in a network and network connection information of the two servers;
    determining whether the two servers are in two different subnets of the network and whether the two different subnets are configured on a same router according to the identifiers of the two servers and the network connection information of the two servers;
    when it is determined that the two servers are in two different subnets of the network and the two different subnets are configured on a same router, instructing a first switch to modify a packet header of a packet sent by a first server to a second server and forward the modified packet to the second server;
    wherein the network comprises the controller, the two servers, and the first switch, and
    wherein the two servers comprise the first server and the second server, the controller is connected to the first switch, the first server is directly connected to the first switch, the first server belongs to a first subnet of the network, and the second server belongs to a second subnet of the network.

7. The computer program product according to claim 6, wherein the step of instructing the first switch to modify a packet header of a packet comprises:
    instructing the first switch to change a destination MAC address of the packet into a MAC address of the second server.

8. The computer program product according to claim 7, wherein the step of instructing the first switch to modify a packet header of a packet further comprises:
    instructing the first switch to set a layer-2 network tag field of the packet to be a layer-2 network tag where the second server is located.

9. The computer program product according to claim 6, wherein the network further comprises a second switch which is connected to the controller, the second switch is directly connected to the second server, and the second switch communicates with the first switch through other network elements in the network, and the process further comprises:
when it is determined that that the two servers are in two different subnets of the network and the two different subnets are configured on a same router, instructing the second switch to: modify the packet header for the packet sent by the first server to the second server, and forward the modified packet to the second server.

10. The computer program product according to claim 9, wherein the step of instructing the second switch to modify the packet header for the packet comprises:
instructing the second switch to modify a source MAC address of the packet into a MAC address of a gateway corresponding to the second subnet.

11. A network controller, comprising:
a processor; and
a computer readable storage medium storing program instructions for execution by the processor,
wherein the program instructions cause the processor to:
obtain identifiers of two servers in a network and network connection information the two servers;
determine whether the two servers are in two different subnets of the network and whether the two different subnets are configured on a same router according to the identifiers of the two servers and the network connection information of the two servers;
when it is determined that the two servers are in two different subnets of the network and the two different subnets are configured on a same router, instruct a first switch to: modify a packet header of a packet sent by a first server to a second server and forward the modified packet to the second server;
wherein the network comprises the controller, the two servers, and the first switch, and
wherein the two servers comprise the first server and the second server, the controller is connected to the first switch, the first server is directly connected to the first switch, the first server belongs to a first subnet of the network, and the second server belongs to a second subnet of the network.

12. The network controller according to claim 11, wherein in instructing the first switch to modify a packet header of a packet sent by a first server to a second server, the processor instructs the first switch to change a destination MAC address of the packet into a MAC address of the second server.

13. The network controller according to claim 12, wherein in instructing the first switch to modify a packet header of a packet sent by a first server to a second server, the processor further instructs the first switch to set a layer-2 network tag field of the packet to be a layer-2 network tag where the second server is located.

14. The network controller according to claim 11, wherein the network further comprises a second switch which is connected to the controller, the second switch is directly connected to the second server, and the second switch communicates with the first switch through other network elements in the network, and wherein the program instructions further cause the processor to:
when it is determined that that the two servers are in two different subnets of the network and the two different subnets are configured on a same router, instruct the second switch to: modify the packet header for the packet sent by the first server to the second server and forward the modified packet to the second server.

15. The network controller according to claim 14, wherein in instructing the second switch to modify the packet header for the packet sent by a first server to a second server, the processor instructs the second switch to modify a source MAC address of the packet into a MAC address of a gateway corresponding to the second subnet.

* * * * *